(12) United States Patent
Kim

(10) Patent No.: US 8,614,877 B2
(45) Date of Patent: Dec. 24, 2013

(54) MULTILAYER CERAMIC CAPACITOR

(75) Inventor: Hyung Joon Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 29 days.

(21) Appl. No.: 13/421,610

(22) Filed: Mar. 15, 2012

(65) Prior Publication Data

US 2013/0050897 A1    Feb. 28, 2013

(30) Foreign Application Priority Data

Aug. 31, 2011   (KR) .................. 10-2011-0088031

(51) Int. Cl.
 *H01G 4/06*   (2006.01)
(52) U.S. Cl.
 USPC ............... 361/321.2; 361/321.1; 361/301.4; 361/306.1; 361/306.3; 361/305
(58) Field of Classification Search
 USPC .......... 361/321.2, 321.1, 306.1, 306.3, 301.4, 361/311–313, 305, 308.1
 See application file for complete search history.

(56) References Cited

U.S. PATENT DOCUMENTS

| | | | |
|---|---|---|---|
| 6,310,759 B2 * | 10/2001 | Ishigaki et al. ............... | 361/309 |
| 6,661,640 B2 * | 12/2003 | Togashi ....................... | 361/306.3 |
| 6,940,710 B1 * | 9/2005 | Lee et al. ..................... | 361/321.2 |
| 7,280,342 B1 * | 10/2007 | Randall et al. ................ | 361/303 |
| 7,460,354 B2 * | 12/2008 | Shimizu et al. ............... | 361/303 |
| 7,508,647 B2 * | 3/2009 | Takashima et al. .......... | 361/306.3 |
| 8,355,240 B2 * | 1/2013 | Satou .......................... | 361/306.3 |

FOREIGN PATENT DOCUMENTS

| | | |
|---|---|---|
| JP | 07-122455 A | 5/1995 |
| JP | 10-106881 A | 4/1998 |
| JP | 2004-140183 A | 5/2004 |
| JP | 2009-54973 A | 3/2009 |
| KR | 10-2010-0068056 A | 6/2010 |

OTHER PUBLICATIONS

Japanese Office Action issued in Application No. 2012-064931 dated Oct. 1, 2013.

* cited by examiner

*Primary Examiner* — Nguyen T Ha
(74) *Attorney, Agent, or Firm* — McDermott Will & Emery LLP

(57) ABSTRACT

There is provided a multilayer ceramic capacitor including: a ceramic body; first and second internal electrodes provided within the ceramic body and including respective lead-out portions exposed to a first surface of the ceramic body and a third or fourth surface thereof connected to the first surface and having an overlapping area, the overlapping area being exposed to the first surface of the ceramic body; first and second external electrodes extended from the first surface of the ceramic body to the third or fourth surface thereof connected to the first surface and connected to the respective lead-out portions; and an insulation layer formed on the first surface of the ceramic body and the third and fourth surfaces thereof connected to the first surface.

12 Claims, 8 Drawing Sheets

MULTILAYER CERAMIC CAPACITOR

CROSS-REFERENCE TO RELATED APPLICATIONS

This application claims the priority of Korean Patent Application No. 10-2011-0088031 filed on Aug. 31, 2011, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor having excellent capacitance and low equivalent series inductance (ESL).

2. Description of the Related Art

Generally, electronic components using a ceramic material, such as a capacitor, an inductor, a piezoelectric element, a varistor, or a thermistor, or the like, include a ceramic body formed of a ceramic material, internal electrodes formed within the ceramic body, and external electrodes mounted on surfaces of the ceramic body so as to be connected to the internal electrodes.

Among ceramic electronic components, a multilayer ceramic capacitor (MLCC) includes a plurality of laminated dielectric layers, internal electrodes disposed to face each other, in which each pair of internal electrodes has one of the dielectric layers disposed therebetween, and external electrodes electrically connected to the internal electrodes.

The multilayer ceramic capacitor provides the advantages of compactness, high capacitance, and ease of mounting, so it is therefore used extensively in mobile communications devices such as notebook computers, personal digital assistances (PDAs), and cellular phones.

Recently, as electronic products have been miniaturized and have become multi-functionalized, chip components have also tended to have been miniaturized and multi-functionalized. Accordingly, there is a need to miniaturize the multilayer ceramic capacitor and increase the capacitance thereof.

In addition, the multilayer ceramic capacitor has been usefully used as a bypass capacitor disposed in a large scale integration (LSI) power supply circuit. The multilayer ceramic capacity needs to have the capability to effectively remove high frequency noise in order to serve as a bypass capacitor. This demand has been further increased in accordance with the trend toward electronic devices having high frequencies. The multilayer ceramic capacitor used as the bypass capacitor may be electrically connected to a mounting pad on a circuit board through soldering, and the mounting pad may be connected to other external circuits through wiring patterns on, or conductive vias in, the circuit board.

The multilayer ceramic capacitor has equivalent series resistance (ESR) and equivalent series inductance (ESL) components in addition to a capacitance component. These ESR and ESL components may hinder a function of the bypass capacitor. Particularly, ESL increases capacitor inductance at high frequencies to thereby hinder high frequency noise removal characteristics.

SUMMARY OF THE INVENTION

An aspect of the present invention provides a multilayer ceramic capacitor having excellent capacitance and low equivalent series inductance (ESL).

According to an aspect of the present invention, there is provided a multilayer ceramic capacitor including: a ceramic body; first and second internal electrodes provided within the ceramic body and including respective lead-out portions exposed to a first surface of the ceramic body and a third or fourth surface thereof connected to the first surface and having an overlapping area, the overlapping area being exposed to the first surface of the ceramic body; first and second external electrodes extended from the first surface of the ceramic body to the third or fourth surface thereof connected to the first surface and connected to the respective lead-out portions; and an insulation layer formed on the first surface of the ceramic body and the third and fourth surfaces thereof connected to the first surface.

The first internal electrode may have a first lead-out portion exposed to the first and third surfaces of the ceramic body, and the second internal electrode may have a second lead-out portion exposed to the first and fourth surfaces of the ceramic body.

The first external electrode may be extended from the first surface of the ceramic body to the third surface thereof, and the second external electrode may be extended from the first surface of the ceramic body to the fourth surface thereof.

The first and second internal electrodes may have ends exposed to the third and fourth surfaces of the ceramic body.

The first and second internal electrodes may be disposed perpendicularly to a mounting surface of the ceramic body.

The insulation layer may be formed of a ceramic slurry.

The first external electrode may be connected to a portion of the lead-out portion of the first internal electrode that does not overlap the lead-out portion of the second internal electrode.

The insulation layer may entirely cover the overlapping area of the lead-out portions of the first and second internal electrodes.

The insulation layer may have a height lower than those of the first and second external electrodes measured from the first surface of the ceramic body.

The ceramic body may have a shorter length in an x-direction, in which the first and second external electrodes, having a predetermined interval therebetween, are formed, than that of a y-direction, in which the first and second internal electrodes are laminated.

The first internal electrode may have two lead-out portions. One lead-out portion may be exposed to the first and third surfaces of the ceramic body, and the other lead-out portion may be exposed to the first and fourth surfaces of the ceramic body. The two lead-out portions of the first internal electrode may form overlapping areas with the lead-out portion of the second internal electrode on the first surface.

The first and second internal electrodes may have two respective lead-out portions exposed to the first surface of the ceramic body and a second surface thereof opposed to the first surface. One lead-out portion of the first internal electrode may be exposed to the first and third surfaces, and the other lead-out portion of the first internal electrode may be exposed to the second and third surfaces. One lead-out portion of the second internal electrode may be exposed to the first and fourth surfaces, and the other lead-out portion of the second internal electrode may be exposed to the second and fourth surfaces.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
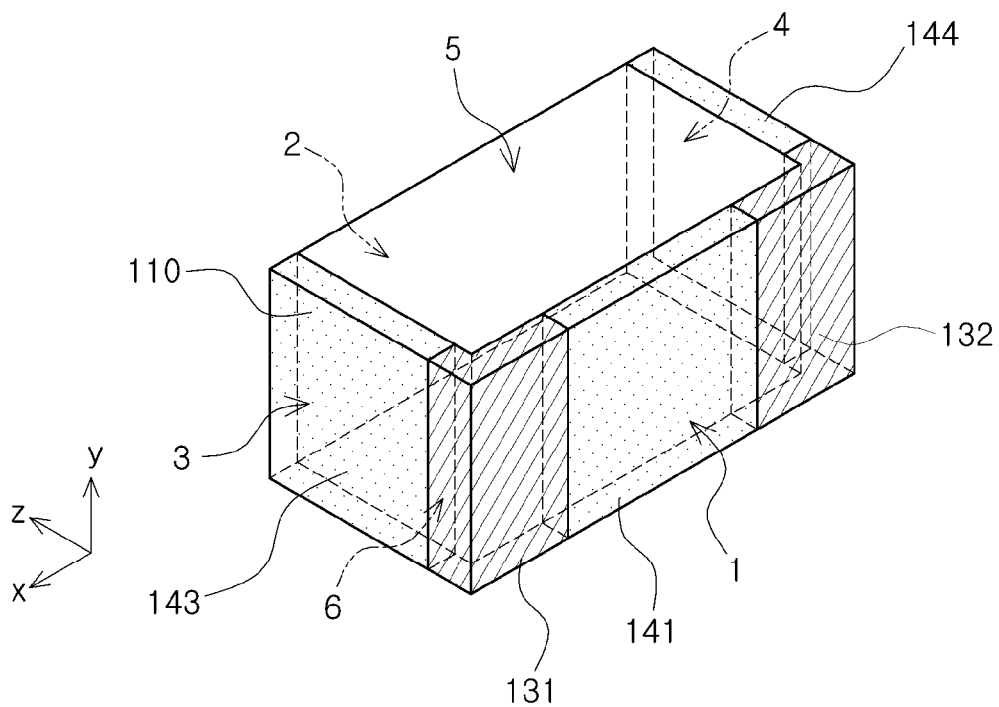
FIGS. 1A and 1B are schematic perspective views showing a multilayer ceramic capacitor according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 1B:
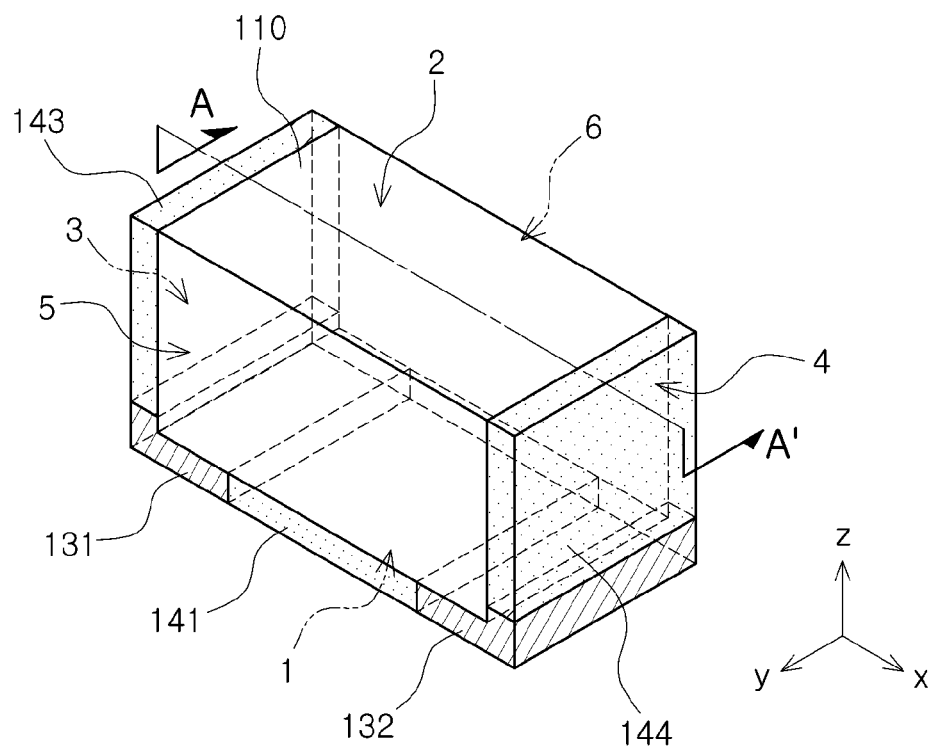
Figure 2:
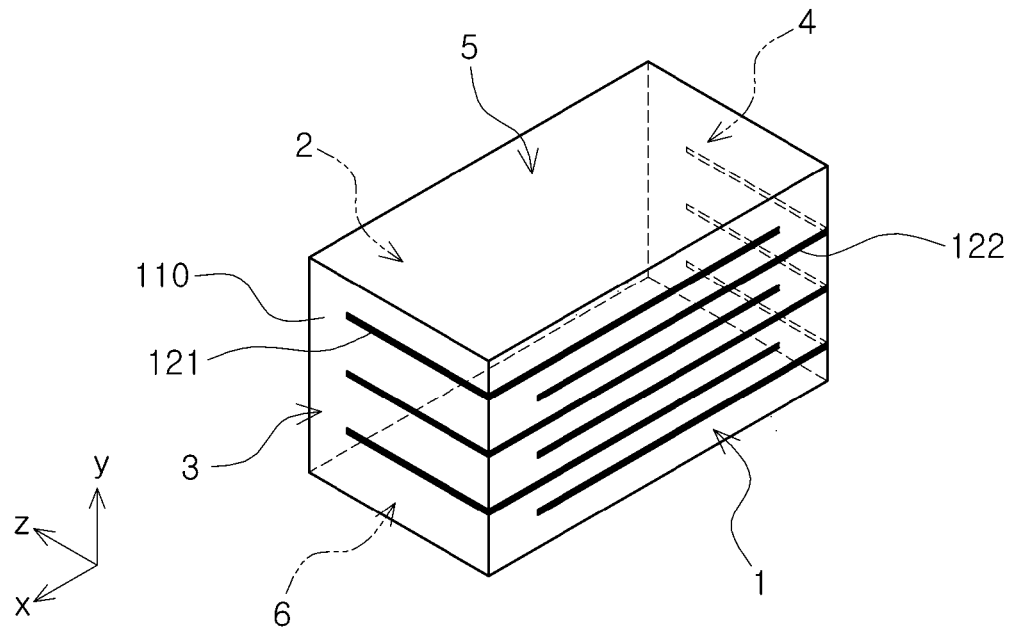
FIG. 2 is a schematic perspective view showing a ceramic body of the multilayer ceramic capacitor shown in FIGS. 1A and 1B.
Figure 3:
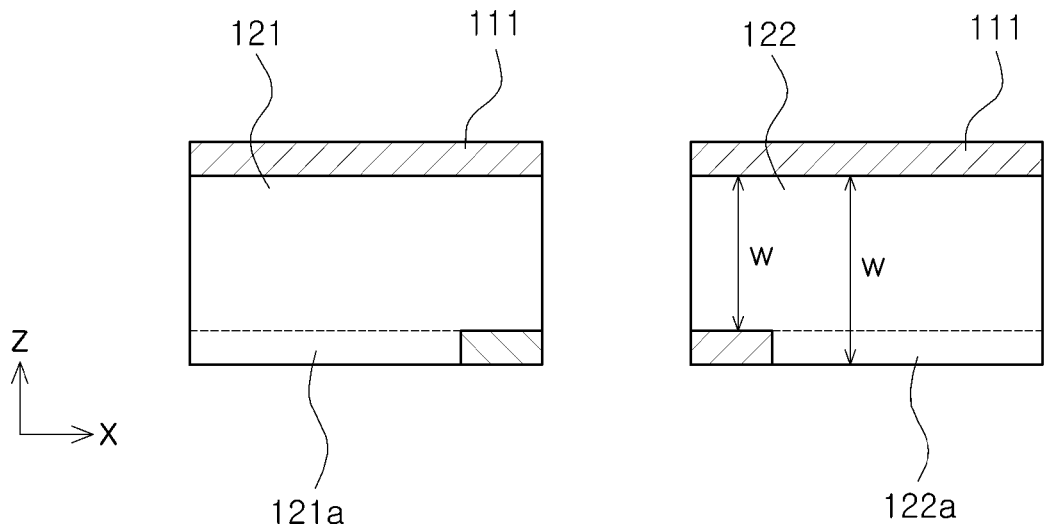
FIG. 3 is cross-sectional views showing a structure of internal electrodes of the multilayer ceramic capacitor shown in FIGS. 1A through 2.
Figure 4:
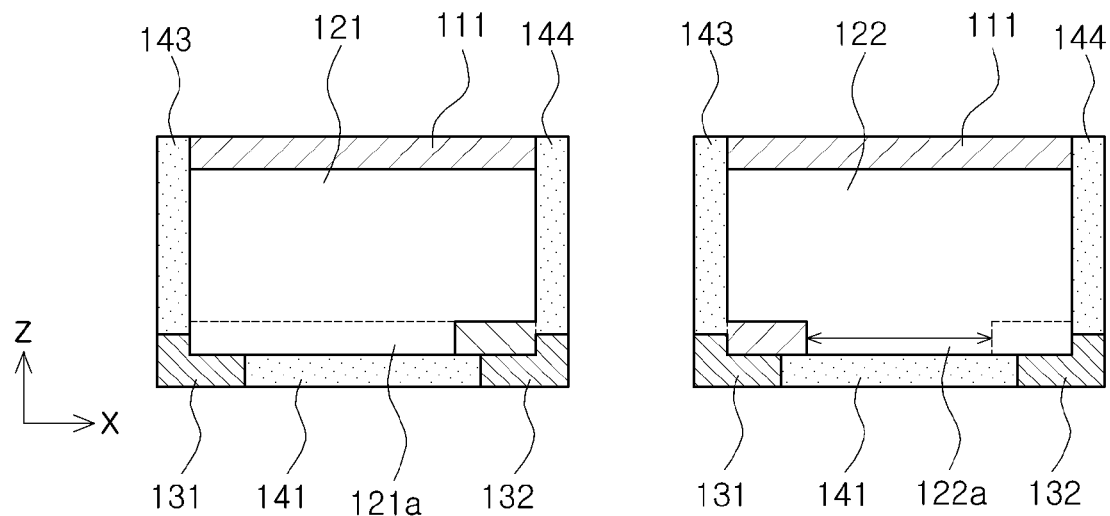
FIG. 4 is cross-sectional views taken along line A-A' of FIG. 1B.

FIGS. 1A and 1B are schematic perspective views showing a multilayer ceramic capacitor according to an embodiment of the present invention; and FIG. 2 is a schematic perspective view showing a ceramic body of the multilayer ceramic capacitor shown in FIGS. 1A and 1B. FIG. 3 is cross-sectional views showing a structure of internal electrodes of the multilayer ceramic capacitor shown in FIGS. 1A through 2. FIG. 4 is cross-sectional views taken along line A-A' of FIG. 1B.

The multilayer ceramic capacitor according to the present embodiment may be a two-terminal vertically laminated or vertical multilayer capacitor. Here, "vertically laminated or vertical multilayer capacitor" means that internal electrodes laminated within a capacitor are disposed perpendicularly to a mounting surface of a circuit board, and "two-terminal" means that two terminals are connected to the circuit board as the capacitor terminals.

Referring to FIGS. 1A through 4, the multilayer ceramic capacitor according to the present embodiment may include a ceramic body 110; internal electrodes 121 and 122 formed within the ceramic body; and insulation layers 141, 143, and 144 and external electrodes 131 and 132 formed on one surface of the ceramic body.

According to the present embodiment, the ceramic body 110 may have first and second surfaces 1 and 2 opposing each other, and third to sixth surfaces 3 to 6 connecting the first and second surfaces 1 and 2 to each other. The shape of the ceramic body 110 is not particularly limited but may be a rectangular parallelepiped having the first to sixth surfaces, as shown. According to the embodiment of the present invention, the third and fourth surfaces 3 and 4 may oppose each other, and the fifth and sixth surfaces 5 and 6 may oppose each other. According to the embodiment of the present invention, the first surface 1 of the ceramic body may be a mounting surface disposed on a mounting area of a circuit board.

According to the embodiment of the present invention, an x-direction refers to a direction in which first and second external electrodes, having a predetermined interval therebetween, are formed; a y-direction refers to a direction in which the internal electrodes, having dielectric layers therebetween, are laminated; and a z-direction refers to a direction in which the internal electrodes are mounted on the circuit board.

According to the embodiment of the present invention, the ceramic body 110 may be formed by laminating a plurality of dielectric layers 111. The plurality of dielectric layers 111 configuring the ceramic body 110 may be in a sintered state and may be integrated such that boundaries therebetween may not be readily apparent.

The dielectric layer 111 may be formed by firing a ceramic green sheet containing a ceramic powder, an organic solvent, and an organic binder. Here, the ceramic powder may have a high dielectric constant, and a barium titanate ($BaTiO_3$) based material, a strontium titanate ($SrTiO_3$) based material, or the like, may be used therefor. However, the ceramic powder is not limited thereto.

According to the embodiment of the present invention, the ceramic body 110 may include the internal electrodes formed therein.

FIG. 3 is cross-sectional views showing the dielectric layers 111 configuring the ceramic body 110 and the internal electrodes 121 and 122 formed on the dielectric layer. According to the embodiment of the present invention, the first internal electrode 121 having a first polarity and the second internal electrode 122 having a second polarity may be formed as a pair and be disposed to face each other in the y-direction, having the dielectric layer 111 interposed therebetween. According to the embodiment of the present invention, the first and second internal electrodes 121 and 122 may be disposed perpendicularly to the mounting surface, that is, the first surface 1, of the multilayer ceramic capacitor.

In the embodiments of the present invention, first and second electrodes may have different polarities, first and third electrodes may have the same polarity, and second and fourth electrodes may have the same polarity.

According to the embodiment of the present invention, the first and second internal electrodes may be formed of a conductive paste containing a conductive metal. The conductive metal may be Ni, Cu, Pd, or an alloy thereof but is not limited thereto.

The internal electrode may be printed on a ceramic green sheet configuring the dielectric layer using a conductive paste through a printing method such as a screen printing method or a gravure printing method. The ceramic green sheets having the internal electrodes printed thereon may be alternately laminated and fired to thereby form the ceramic body.

Referring to FIG. 3, the first and second internal electrodes 121 and 122 have respective first and second lead-out portions 121a and 122a so as to be connected to the external electrodes having different polarities. The first and second lead-out portions 121a and 122a may be exposed to the first surface 1 of the ceramic body.

According to the embodiment of the present invention, the lead-out portion of the internal electrode is an area in which a conductor pattern forming the internal electrode has an increased width W to thereby be exposed to one surface of the ceramic body.

The multilayer ceramic capacitor according to the embodiment of the present invention may be a vertically laminated or vertical multilayer capacitor, and the first and second lead-out portions 121a and 122a may be exposed to the same surface of the ceramic body. According to the present embodiment, the first and second lead-out portions 121a and 122a are exposed to the first surface of the ceramic body. According to the embodiment of the present invention, the first lead-out portion 121a may be exposed to the first surface of the ceramic body and the third surface thereof connected to the first surface. In addition, the second lead-out portion 122a may be exposed to the first surface of the ceramic body and the fourth surface thereof connected to the first surface.

In addition, as shown in FIGS. 2 and 3, according to the embodiment of the present invention, an end of the first internal electrode 121 may be exposed to the third and fourth surfaces of the ceramic body, and an end of the second internal electrode 122 may be exposed to the third and fourth surfaces thereof.

According to the embodiment of the present invention, the first and second internal electrodes may have a margin portion on only the second surface of the ceramic body and may be exposed to the third and fourth surfaces thereof without a margin portion. In addition, the first and second lead-out portions may be partially overlapped with each other with respect to the first surface, such that the internal electrodes may be formed to have increased areas. Therefore, the overlapping area between the first and second internal electrodes is increased, whereby a high capacitance multilayer ceramic capacitor may be realized.

Generally, the first and second internal electrodes form capacitance in an overlapping area, and the lead-out portions connected to the external electrodes having different polarities do not have an overlapping area. However, according to the embodiment of the present invention, the first and second lead-out portions 121a and 122a may have an overlapping area. According to the embodiment of the present invention, the first and second lead-out portions are exposed to the first surface, and the exposed areas may be partially overlapped.

Referring to FIG. 4, the first external electrode 131 may be formed to be connected to the first lead-out portion 121a of the first internal electrode exposed to the ceramic body. According to the embodiment of the present invention, the first lead-out portion 121a of the first internal electrode may be exposed to the first and third surfaces of the ceramic body, and the first external electrode 131 may be extended from the first surface of the ceramic body to the third surface thereof.

In addition, the second external electrode 132 may be formed to be connected to the second lead-out portion 122a of the second internal electrode exposed to the first surface of the ceramic body. The second external electrode 132 may be extended from the first surface of the ceramic body to the fourth surface thereof. The second external electrode 132 may be formed on the fourth surface of the ceramic body so as to be connected to the second lead-out portion 122a exposed to the fourth surface of the ceramic body.

According to the embodiment of the present invention, the first external electrode may be formed to cover a corner portion of the first lead-out portion of the first internal electrode connecting the first and third surfaces of the ceramic body to each other, and the second external electrode may be formed to cover a corner portion of the second lead-out portion of the second internal electrode connecting the first and fourth surfaces of the ceramic body to each other. Therefore, adhesion strength of the external electrodes to the internal electrodes may be improved.

The first external electrode 131 may be connected to a portion of the first lead-out portion 121a that does not overlap the second lead-out portion 122a, and the second external electrode 132 may be connected to a portion of the second lead-out portion 122a that does not overlap the first lead-out portion 121a.

The first external electrode 131 may be connected to the portion of the first lead-out portion 121a so as not to contact the second lead-out portion 122a, and the second external electrode 132 may be connected to the portion of the second lead-out portion 122a so as not to contact the first lead-out portion 121a.

In the right view of FIG. 4, an overlapping area between the lead-out portion of the first internal electrode 121a and the lead-out portion 122a of the second internal electrode is denoted by an arrow, and the lead-out portion of the second internal electrode that does not overlap the lead-out portion of the first internal electrode is denoted by a dotted line.

According to the embodiment of the present invention, the first and second lead-out portions 121a and 122a may have the overlapping area, and be connected to the first and second external electrodes 131 and 132 having different polarities, respectively.

According to the embodiment of the present invention, as shown in FIG. 4, the insulation layers 141, 143, and 144 may be formed on one surface of the ceramic body. More specifically, the first insulation layer 141 may be formed on the first surface of the ceramic body, and the second and third insulation layers 143 and 144 may be formed on the third and fourth surfaces thereof, respectively.

The first insulation layer 141 formed on the first surface of the ceramic body may be formed between the first and second external electrodes 131 and 132. The first insulation layer 141 may be formed to cover the first and second lead-out portions 121a and 122a exposed to the first surface, and may entirely cover the overlapping area between the first and second lead-out portions.

As shown in FIG. 4, the first insulation layer 141 may be formed to completely cover the first surface of the ceramic body between the first and second external electrodes.

In addition, although not shown, according to the embodiment of the present invention, the first insulation layer 141 may only cover the overlapping area between the first and second lead-out portions while having predetermined intervals from the first and second external electrodes 131 and 132.

According to the embodiment of the present invention, the second and third insulation layers 143 and 144 may be formed on the third and fourth surfaces of the ceramic body to which the ends of the first and second internal electrodes 121 and 122 are exposed.

According to the embodiment of the present invention, the insulation layers 141, 143 and 144 may be formed of a ceramic slurry. A position and a height of each insulation layer may be adjusted with reference to an amount and a shape of the ceramic slurry. The insulation layers 141, 143 and 144 may be formed by applying a ceramic slurry to the ceramic body formed by a firing process and then firing the ceramic slurry.

Alternatively, the insulation layer may be formed by forming a ceramic slurry for the insulation layer on the ceramic green sheet configuring the ceramic body and then firing the ceramic slurry together with the ceramic green sheet.

A method of forming the ceramic slurry is not particularly limited. For example, the ceramic slurry may be formed by spraying, applying with a roller, coating, attaching or the like.

The insulation layers 141, 143 and 144 cover the lead-out portions 121*a* and 122*b* of the first and second internal electrodes and the ends of the first and second internal electrodes 121 and 122 exposed to one surface of the ceramic body, whereby a short-circuit between the internal electrodes may be prevented and an internal defect such as a deterioration in humidity resistance characteristics, or the like, may be prevented.

According to the embodiment of the present invention, since even the lead-out portions of the first and second internal electrodes are overapped, capacitance of the multilayer ceramic capacitor may be increased. In addition, a distance between the first and second internal electrodes to which external polarities are applied may be relatively close, such that a current loop may be shortened. Therefore, equivalent series inductance (ESL) may be reduced.

Figure 5:
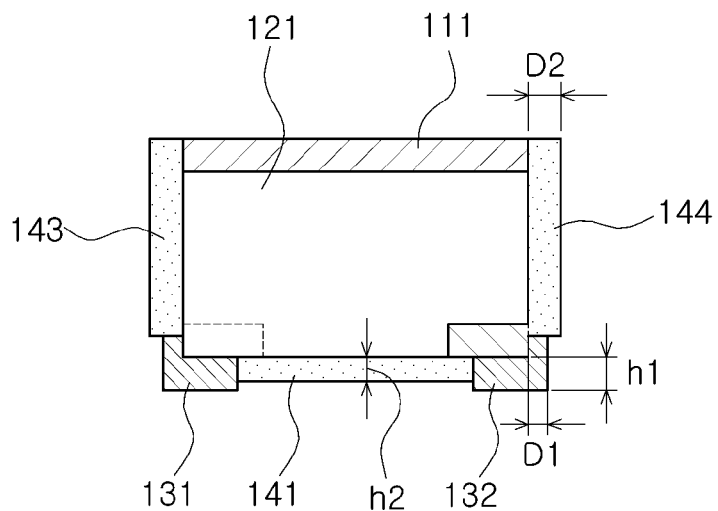
FIG. 5 is a cross-sectional view showing a multilayer ceramic capacitor according to another embodiment of the present invention.

FIG. 5 is a cross-sectional view showing a multilayer ceramic capacitor according to another embodiment of the present invention. Hereinafter, components different from those of the above-mentioned embodiments may mainly be described and detailed descriptions of the same components will be omitted.

Referring to FIG. 5, a first external electrode 131 may be formed on first and third surfaces of a ceramic body, and a second external electrode 132 may be formed on first and fourth surfaces thereof, similar to FIG. 4. In addition, a first insulation layer 141 may be formed on the first surface of the ceramic body, a second insulation layer 143 may be formed on the third surface thereof, and a third insulation layer 144 may be formed on the fourth surface thereof.

According to the present embodiment, the first insulation layer 141 may be formed between the first and second external electrodes. The first insulation layer 141 may have a height h2, lower than a height h1 of the first external electrode 131 or the second external electrode 132. The heights of the insulation layer and the external electrode may be measured based on the first surface.

According to the present embodiment, the height of the first insulation layer 141 is lower than those of the first and second external electrodes, such that the multilayer ceramic capacitor may be more stably mounted on a circuit board.

According to the present embodiment, the second or third insulation layer 143 or 144 may have a thickness D2 greater than a thickness D1 of the first or second external electrode 131 or 132. The thicknesses of the insulation layers and the external electrodes may be measured based on the third or fourth surface.

In addition, although not shown, according to the embodiment of the present invention, the second or third insulation layer may have a thickness d2 less than a thickness d1 of the first or second external electrode.

Figure 6:
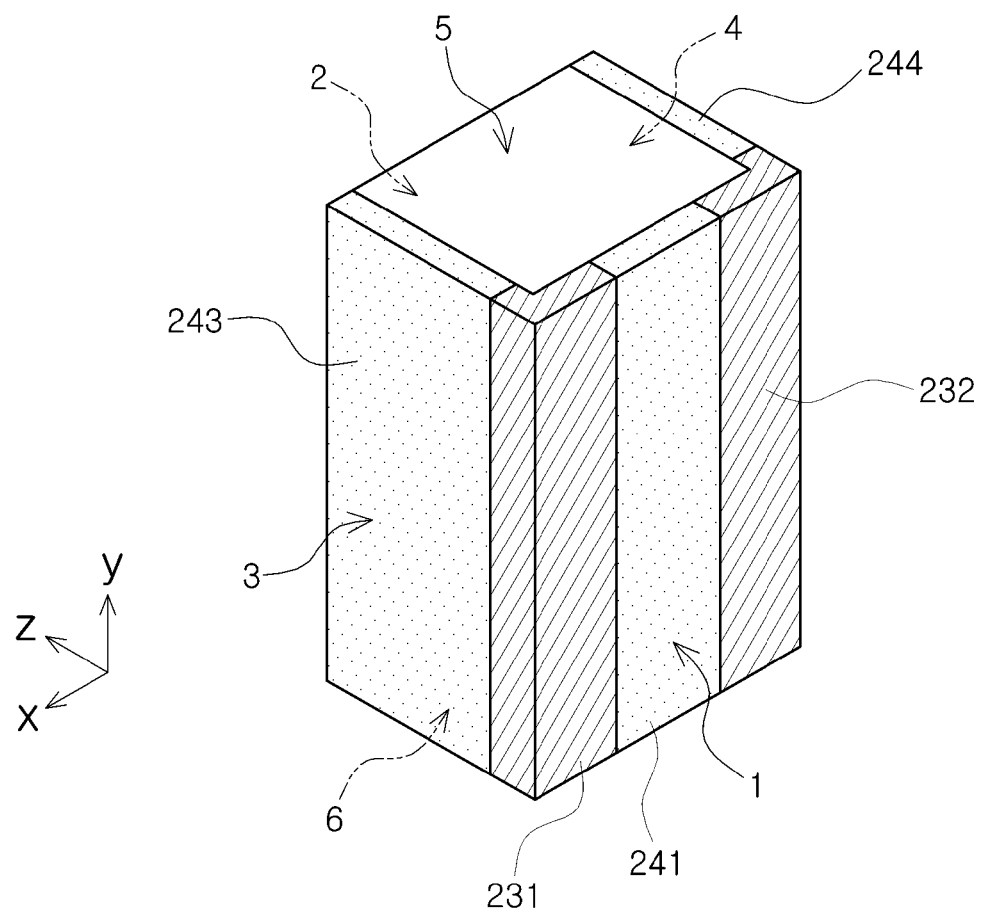
FIG. 6 is a schematic perspective view showing a multilayer ceramic capacitor according to another embodiment of the present invention.
Figure 7:
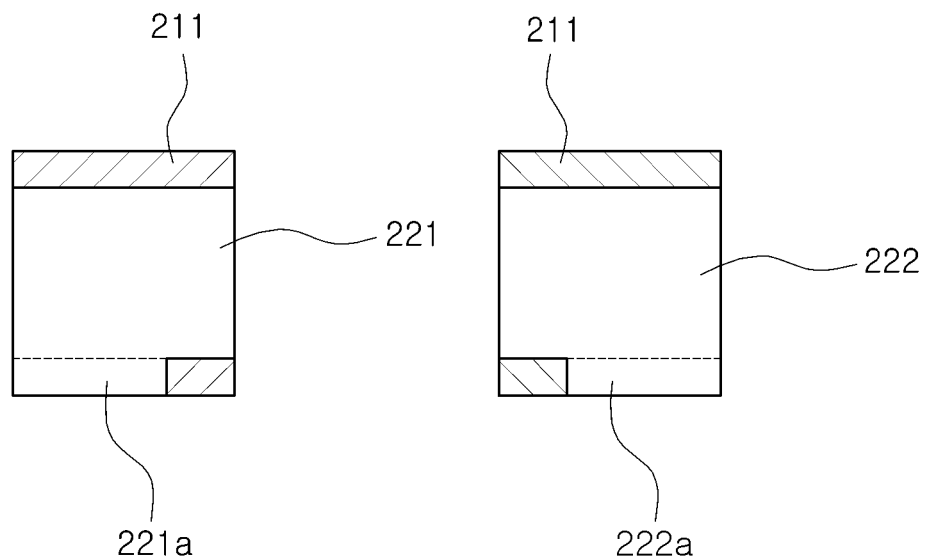
FIG. 7 is cross-sectional views showing a structure of internal electrodes of the multilayer ceramic capacitor shown in FIG. 6.
Figure 8:
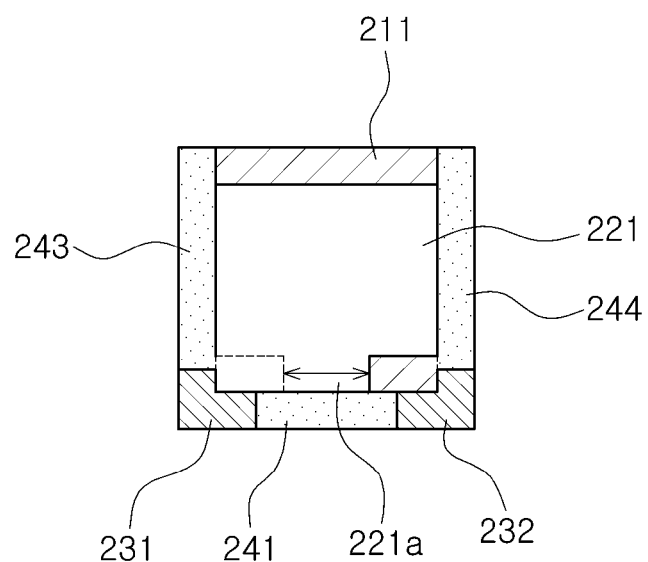
FIG. 8 is a cross-sectional view of the multilayer ceramic capacitor shown in FIG. 6.

FIGS. 6 through 8 show a multilayer ceramic capacitor according to another embodiment of the present invention. FIG. 6 is a schematic perspective view showing the multilayer ceramic capacitor according to the present embodiment; FIG. 7 is cross-sectional views showing a structure of internal electrodes of the multilayer ceramic capacitor shown in FIG. 6; and FIG. 8 is a cross-sectional view of the multilayer ceramic capacitor shown in FIG. 6. Hereinafter, components different from those of the above-mentioned embodiments may mainly be described and detailed descriptions of the same components will be omitted.

Referring to FIGS. 6 through 8, the multilayer ceramic capacitor according to the present embodiment may be a two-terminal vertically laminated or vertical multilayer capacitor. The multilayer ceramic capacitor according to the present embodiment may include a ceramic body 210; internal electrodes 221 and 222 formed within the ceramic body; and insulation layers 241, 243 and 244 and external electrodes 231 and 232 formed on one surface of the ceramic body.

According to the embodiment of the present invention, an x-direction refers to a direction in which the first and second external electrodes, having a predetermined interval therebetween, are formed, a y-direction refers to a direction in which the internal electrodes, having dielectric layers interposed therebetween, are laminated, and a z-direction refers to a direction in which the internal electrodes are mounted on the circuit board.

According to the present embodiment, the multilayer ceramic capacitor may have a shorter length in the x-direction than in the y-direction. That is, the length of the ceramic body in the x-direction, in which the first and second external electrodes, having a predetermined interval therebetween, are formed, may be shorter than the length thereof in the y-direction in which the internal electrodes are laminated.

FIG. 7 is a cross-sectional view showing a dielectric layer 211 configuring the ceramic body 210 and the internal electrodes 221 and 222 formed on the dielectric layer. According to the embodiment of the present invention, the first internal electrode 221 having a first polarity and the second internal electrode 222 having a second polarity may be formed as a pair and be disposed to face each other in the y-direction, having the dielectric layer 211 interposed therebetween. According to the embodiment of the present invention, the first and second internal electrodes 221 and 222 may be disposed perpendicularly to the mounting surface, that is, the first surface 1, of the multilayer ceramic capacitor.

Referring to FIG. 7, the first and second internal electrodes 221 and 222 have respective first and second lead-out portions 221*a* and 222*a* so as to be connected to the external electrodes having different polarities. The first and second lead-out portions 221*a* and 222*a* may be exposed to the first surface 1 of the ceramic body.

According to the embodiment of the present invention, the first lead-out portion 221*a* may be exposed to the first surface of the ceramic body and the third surface thereof connected to the first surface. In addition, the second lead-out portion 222*a* may be exposed to the first surface of the ceramic body and the fourth surface thereof connected to the first surface.

In addition, according to the embodiment of the present invention, an end of the first internal electrode 221 may be exposed to the third and fourth surfaces of the ceramic body, and an end of the second internal electrode 222 may be exposed to the third and fourth surfaces thereof.

According to the embodiment of the present invention, the first and second internal electrodes may have a margin portion on only the second surface of the ceramic body and may be exposed to the third and fourth surfaces thereof without a margin portion. In addition, the first and second lead-out portions may be partially overlapped with each other with respect to the first surface, such that the internal electrodes may be formed to have increased areas. Therefore, the overlapping area between the first and second internal electrodes is increased, whereby a high capacitance multilayer ceramic capacitor may be realized.

According to the embodiment of the present invention, the first and second lead-out portions 221*a* and 222*a* may be exposed to the first surface, and the exposed areas may be partially overlapped.

Referring to FIGS. 7 and 8, the first external electrode 231 may be formed to be connected to the first lead-out portion 221*a* of the first internal electrode exposed to the first surface of the ceramic body. According to the embodiment of the present invention, the first lead-out portion 221*a* of the first internal electrode may be exposed to the first and third surfaces of the ceramic body, and the first external electrode 231 may be extended from the first surface of the ceramic body to the third surface thereof.

The second external electrode 232 may be formed to be connected to the second lead-out portion 222*a* of the second internal electrode exposed to the first surface of the ceramic body. The second external electrode 232 may be extended from the first surface of the ceramic body to the fourth surface thereof. The second external electrode 232 may be formed on the fourth surface of the ceramic body so as to be connected to the second lead-out portion 222*a* exposed to the fourth surface of the ceramic body.

According to the embodiment of the present invention, the first external electrode may be formed to cover a corner portion of the first lead-out portion of the first internal electrode connecting the first and third surfaces of the ceramic body to each other, and the second external electrode may be formed to cover a corner portion of the second lead-out portion of the second internal electrode connecting the first and fourth surfaces of the ceramic body to each other. Therefore, adhesion strength of the external electrodes to the internal electrodes may be improved.

According to the embodiment of the present invention, as shown in FIG. 4, the insulation layers 241, 243, and 244 may be formed on the ceramic body. More specifically, the first insulation layer 241 may be formed on the first surface of the ceramic body, and the second and third insulation layers 243 and 244 may be formed on the third and fourth surfaces thereof, respectively.

The first insulation layer 241 formed on the first surface of the ceramic body may be formed between the first and second external electrodes 231 and 232. The first insulation layer 241 may be formed to cover the first and second lead-out portions 221*a* and 222*a* exposed to the first surface, and may entirely cover the overlapping area between the first and second lead-out portions.

According to the embodiment of the present invention, the second and third insulation layers 243 and 244 may be formed on the third and fourth surfaces of the ceramic body to which the ends of the first and second internal electrodes 221 and 222 are exposed.

The insulation layers 241, 243, and 244 cover the lead-out portions 221*a* and 222*a* of the first and second internal electrodes exposed to one surface of the ceramic body and the ends of the first and second internal electrodes 121 and 122, whereby a short-circuit between the internal electrodes may be prevented and an internal defect such as a deterioration in humidity resistance characteristics, or the like, may be prevented.

According to the embodiment of the present invention, the first and second internal electrodes may have a margin portion on only the second surface of the ceramic body and may be exposed to the third and fourth surfaces thereof without a margin portion. In addition, the first and second lead-out portions may be partially overlapped with each other with respect to the first surface, such that the internal electrodes may be formed to have increased areas. Therefore, the overlapping area between the first and second internal electrodes is increased, whereby a high capacitance multilayer ceramic capacitor may be realized.

According to the present embodiment, since even the lead-out portions of the first and second internal electrodes are ovelapped, capacitance of the multilayer ceramic capacitor may be increased. In addition, a distance between the first and second internal electrodes to which external polarities are applied may be relatively close, such that a current loop may be shortened. Therefore, ESL may be reduced.

According to the present embodiment, the multilayer ceramic capacitor may have a shorter length in the x-direction than in the y-direction, such that a distance between the first and second external electrodes may be shortened and a distance between the first and second internal electrodes to which external polarities are applied may be relatively close. Therefore, a current loop may be shortened and ESL may be further reduced.

Figure 9:
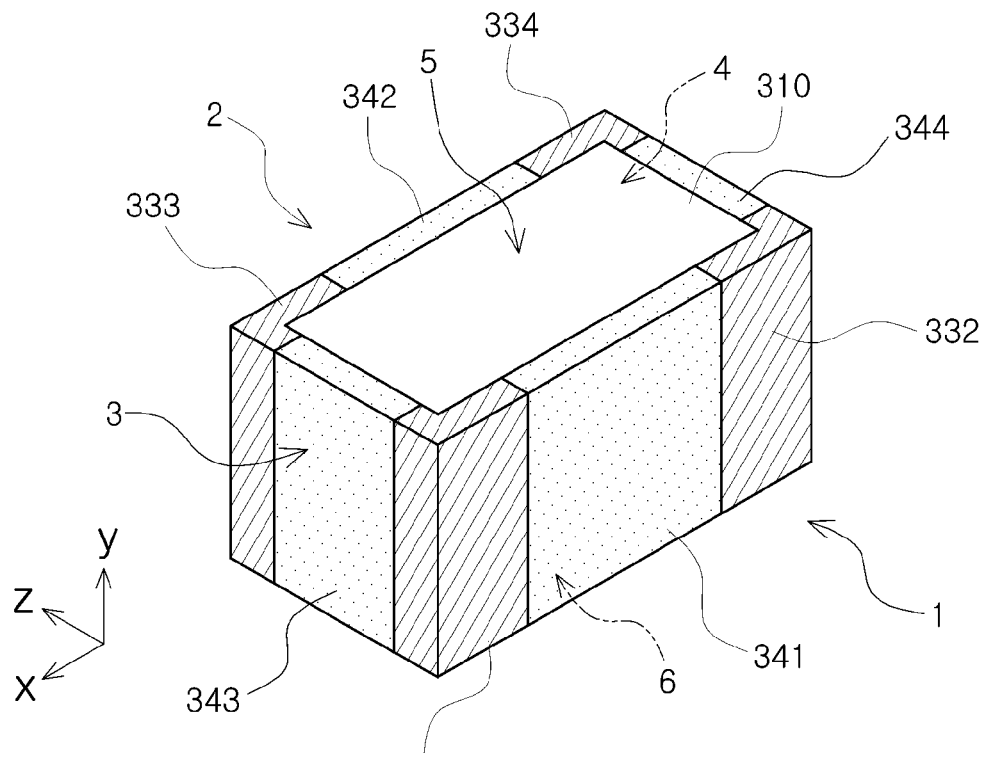
FIG. 9 is a schematic perspective view showing a multilayer ceramic capacitor according to another embodiment of the present invention.
Figure 10:
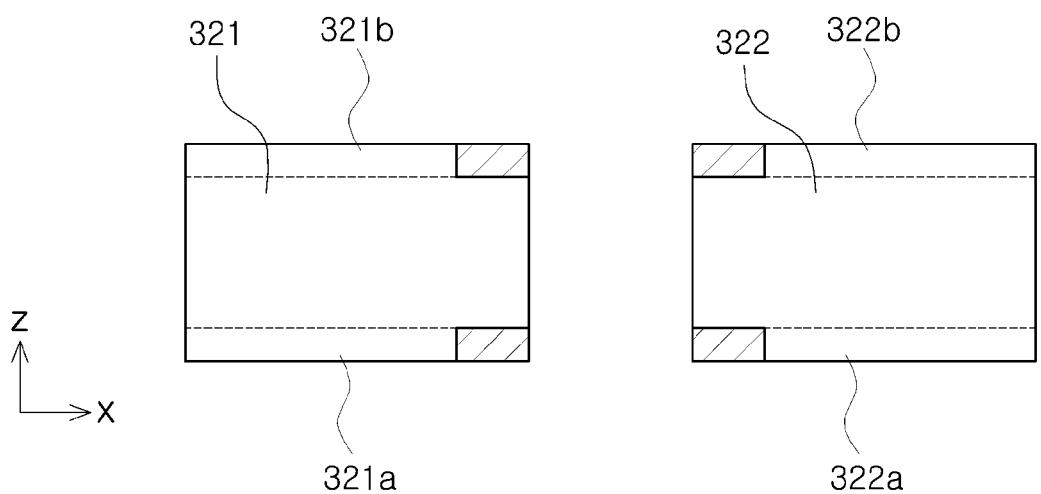
FIG. 10 is cross-sectional views showing a structure of internal electrodes of the multilayer ceramic capacitor shown in FIG. 9.
Figure 11:
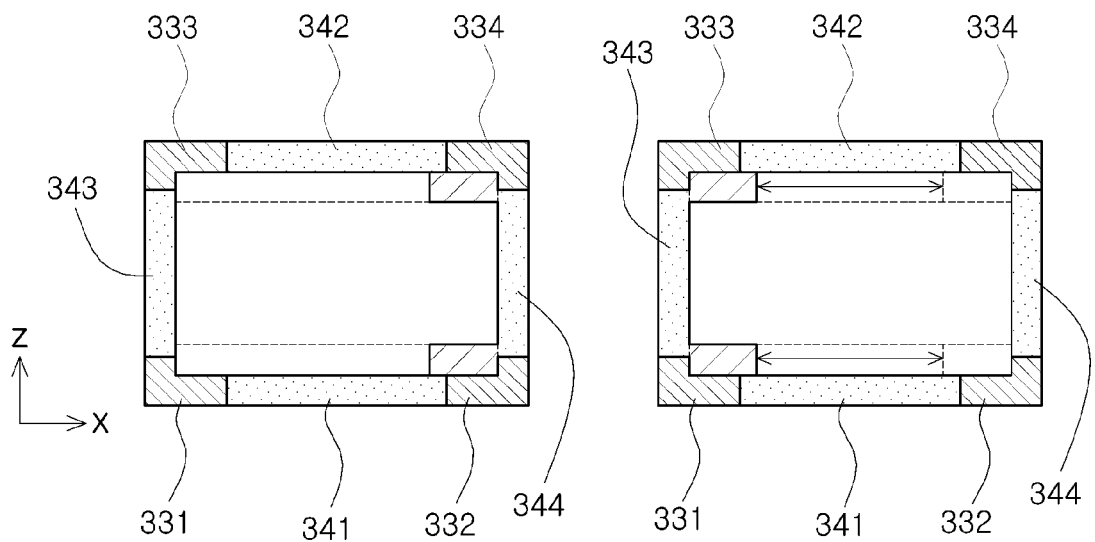
FIG. 11 is cross-sectional views of the multilayer ceramic capacitor shown in FIG. 9.

FIGS. 9 through 11 show a multilayer ceramic capacitor according to another embodiment of the present invention. FIG. 9 is a schematic perspective view showing the multilayer ceramic capacitor according to the present embodiment; FIG. 10 is cross-sectional views showing a structure of internal electrodes of the multilayer ceramic capacitor shown in FIG. 9; and FIG. 11 is cross-sectional views of the multilayer ceramic capacitor shown in FIG. 9. Hereinafter, components different from those of the above-mentioned embodiments may mainly be described and detailed descriptions of the same components will be omitted.

Referring to FIGS. 9 through 11, the multilayer ceramic capacitor according to the present embodiment may be a four-terminal vertically laminated or vertical multilayer capacitor. Here, "four-terminal" means that four terminals are connected to a circuit board as the capacitor terminals.

The multilayer ceramic capacitor according to the present embodiment may include a ceramic body 310; internal electrodes 321 and 322 formed within the ceramic body; and insulation layers 341, 342, 343 and 344 and external electrodes 331, 332, 333, and 334 formed on one surface of the ceramic body.

FIG. 10 is cross-sectional views showing a dielectric layer 311 configuring the ceramic body 310 and the internal electrodes 321 and 322 formed on the dielectric layer. According to the embodiment of the present invention, the first internal electrode 321 having a first polarity and the second internal electrode 322 having a second polarity may be formed as a pair and be disposed to face each other in the y-direction, having the dielectric layer 311 interposed therebetween. According to the embodiment of the present invention, the first and second internal electrodes 321 and 322 may be disposed perpendicularly to a mounting surface of the multilayer ceramic capacitor.

According to the present embodiment, the mounting surface of the multilayer ceramic capacitor may be a first surface or a second surface opposed to the first surface.

Referring to FIG. 10, the first and second internal electrodes 321 and 322 may have first and second lead-out portions 321*a* and 321*b* and first and second lead-out portions 322*a* and 322*b*, respectively, so as to be connected to the external electrodes having different polarities. The two first lead-out portions 321a and 321b of the first internal electrode may be exposed to the first surface of the ceramic body and the second surface thereof opposed to the first surface, respectively, and the two second lead-out portions 322a and 322b of the second internal electrode may be exposed to the first surface of the ceramic body and the second surface thereof opposed to the first surface, respectively.

In addition, the first lead-out portion 321a of the first internal electrode and the second lead-out portion 322a of the second internal electrode may be exposed to the first surface of the ceramic body and have an overlapping area. The first lead-out portion 321b of the first internal electrode and the second lead-out portion 322b of the second internal electrode may be exposed to the second surface of the ceramic body and have an overlapping area.

According to the embodiment of the present invention, the first lead-out portion 321a of the first internal electrode may be exposed to the first surface of the ceramic body and the third surface thereof connected to the first surface, and the first lead-out portion 321b of the first internal electrode may be exposed to the second surface of the ceramic body and the third surface thereof connected to the second surface.

In addition, the second lead-out portion 322a of the second internal electrode may be exposed to the first surface of the ceramic body and the fourth surface thereof connected to the first surface, and the second lead-out portion 322b of the second internal electrode may be exposed to the second surface of the ceramic body and the fourth surface thereof connected to the second surface.

In addition, according to the embodiment of the present invention, an end of the first internal electrode 321 may be exposed to the third and fourth surfaces of the ceramic body, and an end of the second internal electrode 322 may be exposed to the third and fourth surfaces thereof.

According to the embodiment of the present invention, the first and second internal electrodes may be formed on the entirety of the dielectric layers without a margin portion, excepting the first surface of the ceramic body to which the lead-out portions are exposed, so as to be connected to the external electrodes having different polarities. In addition, the first and second lead-out portions may be partially overlapped with each other with respect to the first surface, such that the internal electrodes may be formed to have increased areas. Therefore, the overlapping area between the first and second internal electrodes is increased, whereby a high capacitance multilayer ceramic capacitor may be realized.

Referring to FIG. 11, the first to fourth external electrodes 331 to 334 may be formed to be connected to the first and second lead-out portions 321a, 321b, 322a and 322b of the first and second internal electrodes exposed to the ceramic body.

According to the embodiment of the present invention, the first lead-out portion 321a of the first internal electrode may be exposed to the first and third surfaces of the ceramic body, and the first external electrode 331 may be extended from the first surface of the ceramic body to the third surface thereof so as to be connected to the first lead-out portion 321a of the first internal electrode. In addition, the first lead-out portion 321b of the first internal electrode may be exposed to the second and third surfaces of the ceramic body, and the third external electrode 333 may be extended from the second surface of the ceramic body to the third surface thereof so as to be connected to the first lead-out portion 321b of the first internal electrode.

Further, the second and fourth external electrodes 332 and 334 may be formed to be connected to the two second lead-out portions 322a and 322b of the second internal electrode exposed to the first and fourth surfaces and the second and fourth surfaces, respectively. More specifically, the second lead-out portion 322a of the second internal electrode may be exposed to the first and fourth surfaces of the ceramic body, and the second external electrode 332 may be extended from the first surface of the ceramic body to the fourth surface thereof so as to be connected to the second lead-out portion 322a of the second internal electrode. In addition, the second lead-out portion 322b of the second internal electrode may be exposed to the second and fourth surfaces of the ceramic body, and the fourth external electrode 334 may be extended from the second surface of the ceramic body to the fourth surface thereof so as to be connected to the second lead-out portion 322b of the second internal electrode.

That is, according to the embodiment of the present invention, the external electrodes may be formed to cover corner portions of the lead-out portions of the internal electrodes. Therefore, adhesion strength of the external electrodes to the internal electrodes may be improved.

In the embodiments of the present invention, the first and second electrodes may have different polarities, the first and third electrodes may have the same polarity, and the second and fourth electrodes may have the same polarity.

The first external electrode 331 may be connected to a portion of the first lead-out portion 321a that does not overlap the second lead-out portion 322a, and the third external electrode 333 may be connected to a portion of the first lead-out portion 321b that does not overlap the second lead-out portion 322b. The second external electrode 332 may be connected to a portion of the second lead-out portion 322a that does not overlap the first lead-out portion 321a, and the fourth external electrode 334 may be connected to a portion of the second lead-out portion 322b that does not overlap the first lead-out portion 321b.

In the right view of FIG. 11, overlapping areas between the two lead-out portions of the first internal electrode and the two lead-out portions of the second internal electrode are denoted by arrows, and the lead-out portions of the second internal electrode that do not overlap the lead-out portions of the first internal electrode are denoted by dotted lines.

According to the present embodiment, the insulation layers 341 to 344 may be formed on one surface of the ceramic body. More specifically, the first insulation layer 341 may be formed on the first surface of the ceramic body, and the second insulation layer 342 may be formed on the second surface thereof. In addition, the third and fourth insulation layers 343 and 344 may be formed on the third and fourth surfaces of the ceramic body, respectively.

The first and second insulation layers 341 and 342 may be formed between the first and second external electrodes 331 and 332 and between the third and fourth external electrodes 333 and 334, respectively. The first and second insulation layers 341 and 342 may be formed to cover the first lead-out portions 321a and 322a and the second lead-out portions 321b and 322b exposed to the first and second surfaces, respectively. As described above, the first and second insulation layers may be formed to entirely cover the overlapping areas between the first and second lead-out portions.

The insulation layers 341 to 344 cover the lead-out portions of the first and second internal electrodes and the ends of the first and second internal electrodes exposed to the ceramic body, whereby a short-circuit between the internal electrodes may be prevented and an internal defect such as a deterioration in humidity resistance characteristics, or the like, may be prevented.

According to the embodiment of the present invention, since even the lead-out portions of the first and second internal electrodes are overapped, capacitance of the multilayer ceramic capacitor may be increased. In addition, a distance between the first and second internal electrodes to which external polarities are applied may be relatively close, such that a current loop may be shortened. Therefore, ESL may be reduced.

Figure 12:
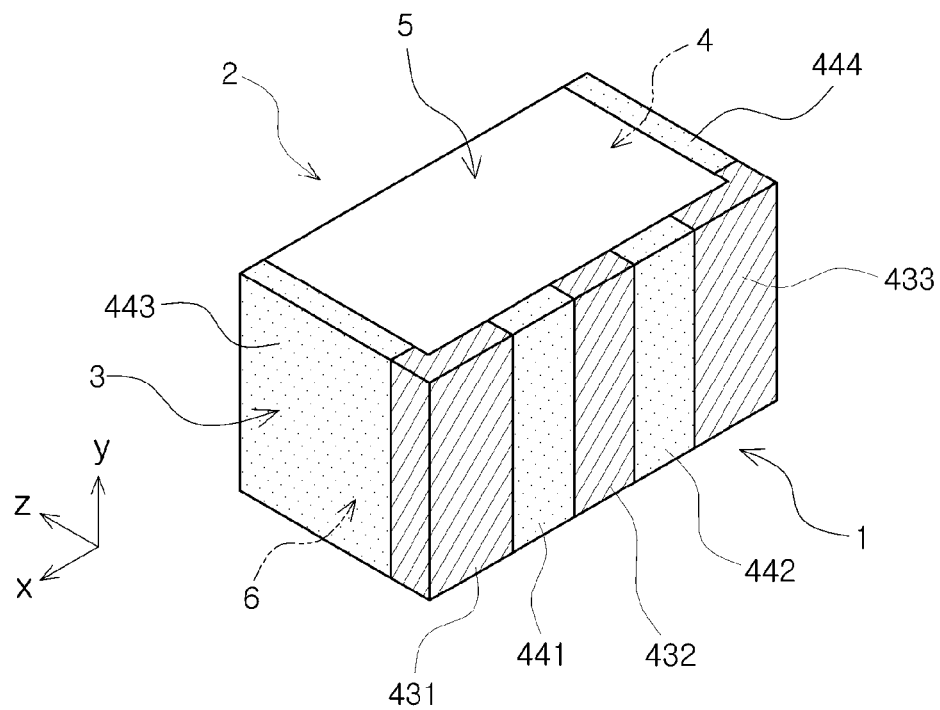
FIG. 12 is a schematic perspective view showing a multilayer ceramic capacitor according to another embodiment of the present invention.
Figure 13:
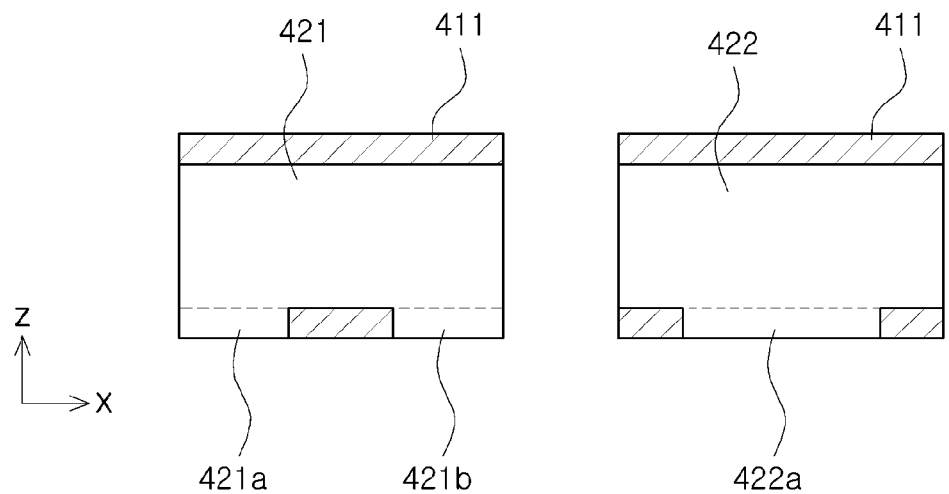
FIG. 13 is cross-sectional views showing a structure of internal electrodes of the multilayer ceramic capacitor shown in FIG. 12.
Figure 14:
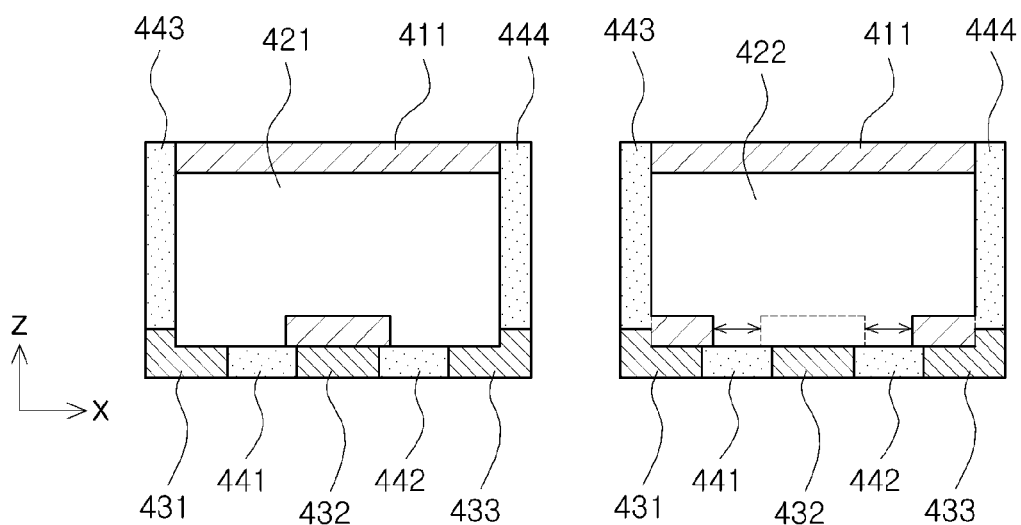
FIG. 14 is cross-sectional views of the multilayer ceramic capacitor shown in FIG. 12.

FIGS. 12 through 14 show a multilayer ceramic capacitor according to another embodiment of the present invention. FIG. 12 is a schematic perspective view showing the multilayer ceramic capacitor according to the present embodiment; FIG. 13 is cross-sectional views showing a structure of internal electrodes of the multilayer ceramic capacitor shown in FIG. 12; and FIG. 14 is cross-sectional views of the multilayer ceramic capacitor shown in FIG. 12. Hereinafter, components different from those of the above-mentioned embodiments may mainly be described and detailed descriptions of the same components will be omitted.

Referring to FIGS. 12 through 14, the multilayer ceramic capacitor according to the present embodiment may be a three-terminal vertically laminated or vertical multilayer capacitor. Here, "three-terminal" means that three terminals are connected to a circuit board as the capacitor terminals.

The multilayer ceramic capacitor according to the present embodiment may include a ceramic body 410; internal electrodes 421 and 422 formed within the ceramic body; and insulation layers 441, 442, 443, and 444 and external electrodes 431, 432, and 433 formed on one surface of the ceramic body.

FIG. 13 is a cross-sectional view showing a dielectric layer 411 configuring the ceramic body 410 and the internal electrodes 421 and 422 formed on the dielectric layer. According to the embodiment of the present invention, the first internal electrode 421 having a first polarity and the second internal electrode 422 having a second polarity may be formed as a pair and be disposed to face each other in the y-direction, having the dielectric layer 411 interposed therebetween. According to the embodiment of the present invention, the first and second internal electrodes 421 and 422 may be disposed perpendicularly to the mounting surface of the multilayer ceramic capacitor.

Referring to FIG. 13, the first and second internal electrodes 421 and 422 have respective first and second lead-out portions 421a, 421b, and 422a so as to be connected to the external electrodes having different polarities. The first and second lead-out portions 421a, 421b, and 422a may be exposed to the first surface of the ceramic body.

According to the present embodiment, the first internal electrode may have the two first lead-out portions 421a and 421b. Each of the two first lead-out portions 421a and 421b of the first internal electrode may have an area overlapping the second lead-out portion 422a of the second internal electrode. According to the embodiment of the present invention, the two first lead-out portions 421a and 421b of the first internal electrode and the second lead-out portion 422a of the second internal electrode may be exposed to the same surface of the ceramic body, and the exposed areas may be partially overlapped.

According to the embodiment of the present invention, the first lead-out portion 421a of the first internal electrode may be exposed to the first surface of the ceramic body and the third surface thereof connected to the first surface, and the first lead-out portion 421b of the first internal electrode may be exposed to the first surface of the ceramic body and the fourth surface thereof connected to the first surface.

In addition, according to the embodiment of the present invention, an end of the first internal electrode 421 may be exposed to the third and fourth surfaces of the ceramic body, and an end of the second internal electrode 422 may be exposed to the third and fourth surfaces thereof.

Referring to FIG. 14, the first and third external electrodes 431 and 433 may be formed on one surface of the ceramic body so as to be connected to the two lead-out portions 421a and 421b of the first internal electrode exposed to one surface of the ceramic body.

According to the present embodiment, the first internal electrode may be connected to an external polarity by the first and third external electrodes. In addition, the second external electrode 432 may be formed to be connected to the second lead-out portion 422a of the second internal electrode exposed to one surface of the ceramic body. The second external electrode 432 may be formed between the first and third external electrodes 431 and 433. In the present invention, the first and second electrodes may have different polarities, and the first and third electrodes may have the same polarity.

Referring to FIG. 14, the first lead-out portion 421a of the first internal electrode may be exposed to the first and third surfaces of the ceramic body, and the first external electrode 431 may be extended from the first surface of the ceramic body to the third surface thereof so as to be connected to the first lead-out portion 421a of the first internal electrode. In addition, the first lead-out portion 421b of the first internal electrode may be exposed to the first and fourth surfaces of the ceramic body, and the third external electrode 433 may be extended from the first surface of the ceramic body to the fourth surface thereof so as to be connected to the first lead-out portion 421b of the first internal electrode. The second external electrode 432 may be formed on the first surface of the ceramic body.

According to the embodiment of the present invention, the first and third external electrodes may be formed to cover a corner portion of the lead-out portion of the first internal electrode. Therefore, adhesion strength of the external electrodes to the internal electrodes may be improved.

The first external electrode 431 may be connected to a portion of the first lead-out portion 421a that does not overlap the second lead-out portion 422a, and the third external electrode 433 may be connected to a portion of the first lead-out portion 421b that does not overlap the second lead-out portion 422a. The second external electrode 432 may be connected to a portion of the second lead-out portion 422a that does not overlap the two first lead-out portions 421a and 421b.

In the right view of FIG. 14, overlapping areas between the two lead-out portions of the first internal electrode and the lead-out portion of the second internal electrode are denoted by arrows, and the lead-out portion of the second internal electrode that does not overlap the two lead-out portions of the first internal electrode is denoted by a dotted line.

According to the present embodiment, the insulation layers 441 to 444 may be formed on one surface of the ceramic body. More specifically, the first and second insulation layers 441 and 442 may be formed between the first and second external electrodes 431 and 432 and between the second and third external electrodes 432 and 433, respectively. The first and second insulation layers 441 and 442 may be formed to cover the first and second lead-out portions 421a, 421b and 422a exposed to one surface of the ceramic body. As described above, the first and second insulation layers may be formed to entirely cover the overlapping areas between the first and second lead-out portions.

In addition, the third insulation layer 443 may be formed on the third surface of the ceramic body, and the fourth insulation layer 444 may be formed on the fourth surface thereof.

The insulation layers 441 to 444 cover the lead-out portions of the first and second internal electrodes and the ends of the first and second internal electrodes exposed to one surface of the ceramic body, whereby a short-circuit between the internal electrodes may be prevented and an internal defect such as a deterioration in humidity resistance characteristics, or the like, may be prevented.

According to the embodiment of the present invention, since even the lead-out portions of the first and second internal electrodes are overapped, capacitance of the multilayer ceramic capacitor may be increased. In addition, a distance between the first and second internal electrodes to which external polarities are applied may be relatively close, such that a current loop may be shortened. Therefore, ESL may be reduced.

Further, according to the present embodiment, current flows to the second internal electrode through the first internal electrode connected to the first and third external electrodes. Due to this current flow, a magnitude of an inductance component connected in series with a capacitance component of the multilayer ceramic capacitor may be significantly reduced.

In addition, although not shown, the first or second internal electrode may include at least two lead-out portions. In addition, the first and second internal electrodes may include overlapping lead-out portions having different polarities. Further, the lead-out portions formed in the first and second internal electrodes may be exposed to the same surface of the ceramic body or may be exposed to different surfaces thereof. The number, positions, and the like, of the lead-out portions formed in the internal electrode may be variously adjusted by those skilled in the art.

As set forth above, according to the embodiment of the present invention, the internal electrodes may be formed to have increased areas while allowing a minimal margin portion to remain on the ceramic body. Therefore, the overlapping area between the first and second internal electrodes is increased, whereby a high capacitance multilayer ceramic capacitor may be realized.

According to the embodiments of the present invention, even the lead-out portions of the first and second internal electrodes are overapped, such that capacitance of the multilayer ceramic capacitor may be increased.

In addition, a distance between the first and second internal electrodes to which external polarities are applied may be relatively close, such that a current loop may be shortened. Therefore, equivalent series inductance (ESL) may be reduced.

According to the embodiments of the present invention, since the external electrode may be formed to cover the corner portion of the lead-out portion of the internal electrode, adhesion strength of the external electrodes to the internal electrodes may be improved.

According to the embodiments of the present invention, the insulation layers formed on the ceramic body cover the lead-out portions of the first and second internal electrodes exposed to one surface of the ceramic body, whereby a short-circuit between the internal electrodes may be prevented and an internal defect such as a deterioration in humidity resistance characteristics, or the like, may be prevented.

According to the embodiments of the present invention, the height of the insulation layer may be adjusted. When the height of the insulation layer is lower than those of the first and second external electrodes, the multilayer ceramic capacitor may be more stably mounted on the circuit board.

According to the embodiments of the present invention, the length of the multilayer ceramic capacitor in the x-direction is shorter than the length thereof in the y-direction, such that a distance between the first and second external electrodes may be shortened and a distance between the first and second internal electrodes to which external polarities are applied may be relatively close. Therefore, a current loop may be shortened and ESL may be further reduced.

In the multilayer ceramic capacitor according to the embodiments of the present invention, current may flow to the internal electrodes through the plurality of external electrodes. Therefore, a magnitude of an inductance component connected in series with a capacitance component of the multilayer ceramic capacitor may be significantly reduced.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
    a ceramic body;
    first and second internal electrodes provided within the ceramic body and including respective lead-out portions exposed to a first surface of the ceramic body and a third or fourth surface thereof connected to the first surface and having an overlapping area, the overlapping area being exposed to the first surface of the ceramic body;
    first and second external electrodes extended from the first surface of the ceramic body to the third or fourth surface thereof connected to the first surface and connected to the respective lead-out portions; and
    an insulation layer formed on the first surface of the ceramic body and the third and fourth surfaces thereof connected to the first surface.

2. The multilayer ceramic capacitor of claim 1, wherein the first internal electrode has a first lead-out portion exposed to the first and third surfaces of the ceramic body, and
    the second internal electrode has a second lead-out portion exposed to the first and fourth surfaces of the ceramic body.

3. The multilayer ceramic capacitor of claim 1, wherein the first external electrode is extended from the first surface of the ceramic body to the third surface thereof, and
    the second external electrode is extended from the first surface of the ceramic body to the fourth surface thereof.

4. The multilayer ceramic capacitor of claim 1, wherein the first and second internal electrodes have ends exposed to the third and fourth surfaces of the ceramic body.

5. The multilayer ceramic capacitor of claim 1, wherein the first and second internal electrodes are disposed perpendicularly to a mounting surface of the ceramic body.

6. The multilayer ceramic capacitor of claim 1, wherein the insulation layer is formed of a ceramic slurry.

7. The multilayer ceramic capacitor of claim 1, wherein the first external electrode is connected to a portion of the lead-out portion of the first internal electrode that does not overlap the lead-out portion of the second internal electrode.

8. The multilayer ceramic capacitor of claim 1, wherein the insulation layer entirely covers the overlapping area of the lead-out portions of the first and second internal electrodes.

9. The multilayer ceramic capacitor of claim 1, wherein the insulation layer has a height lower than those of the first and second external electrodes measured from the first surface of the ceramic body.

10. The multilayer ceramic capacitor of claim 1, wherein the ceramic body has a shorter length in an x-direction, in which the first and second external electrodes, having a predetermined interval therebetween, are formed, than that of a y-direction, in which the first and second internal electrodes are laminated.

11. The multilayer ceramic capacitor of claim 1, wherein the first internal electrode has two lead-out portions,
- one lead-out portion is exposed to the first and third surfaces of the ceramic body,
- the other lead-out portion is exposed to the first and fourth surfaces of the ceramic body, and
- the two lead-out portions of the first internal electrode form overlapping areas with the lead-out portion of the second internal electrode on the first surface.

12. The multilayer ceramic capacitor of claim 1, wherein the first and second internal electrodes has two respective lead-out portions exposed to the first surface of the ceramic body and a second surface thereof opposed to the first surface,
- one lead-out portion of the first internal electrode is exposed to the first and third surfaces,
- the other lead-out portion of the first internal electrode is exposed to the second and third surfaces,
- one lead-out portion of the second internal electrode is exposed to the first and fourth surfaces, and
- the other lead-out portion of the second internal electrode is exposed to the second and fourth surfaces.

* * * * *